April 27, 1965  G. R. GOETZ  3,180,104
APPARATUS FOR SENSING THE CHANGE OF VISCOSITY OF A LIQUID
Filed Sept. 25, 1962  4 Sheets-Sheet 1

INVENTOR
GEORGE R. GOETZ

BY *Garvey & Garvey*
ATTORNEYS

April 27, 1965  G. R. GOETZ  3,180,104
APPARATUS FOR SENSING THE CHANGE OF VISCOSITY OF A LIQUID
Filed Sept. 25, 1962  4 Sheets-Sheet 2
FIG. 4.
FIG. 5.
FIG. 6.
FIG. 10.
FIG. 11.
INVENTOR
GEORGE R. GOETZ
BY Garvey & Garvey
ATTORNEYS
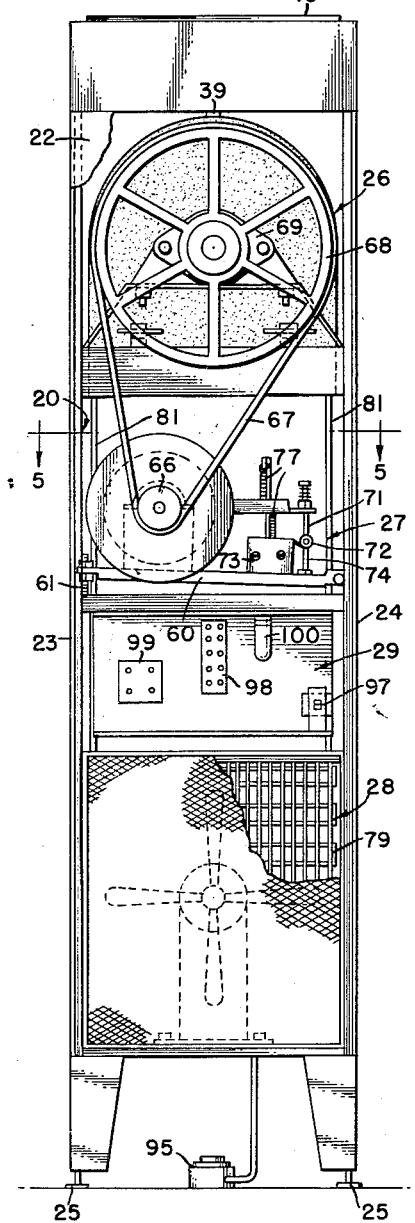
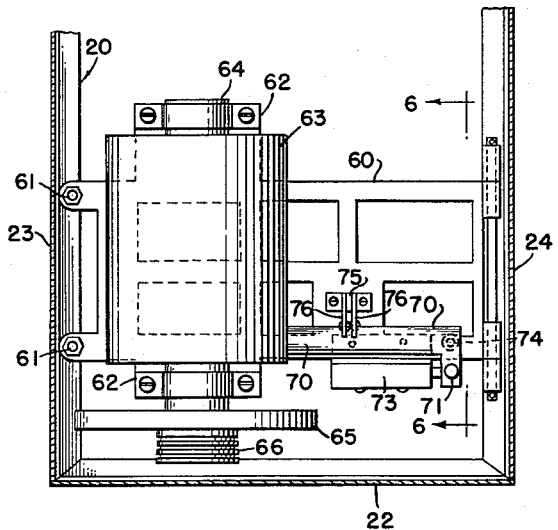
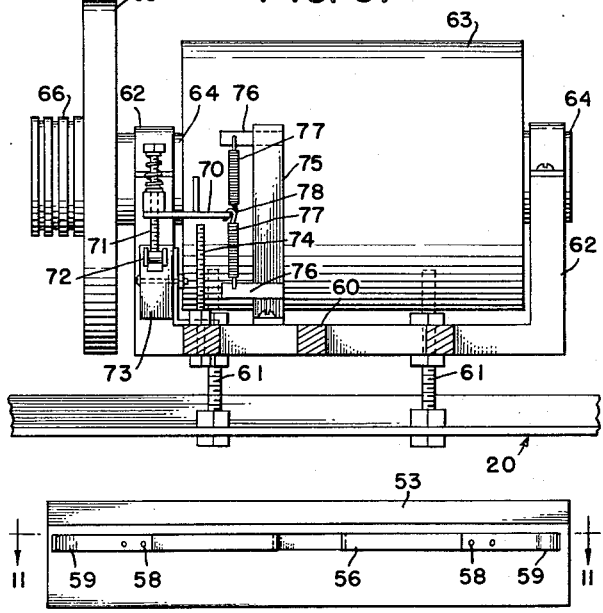
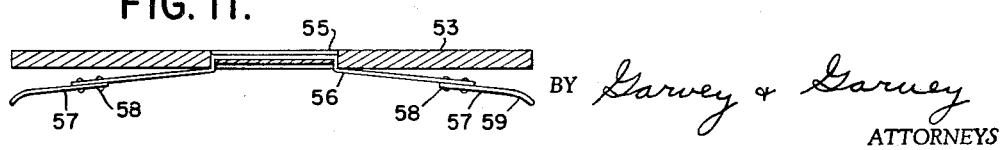

April 27, 1965   G. R. GOETZ   3,180,104
APPARATUS FOR SENSING THE CHANGE OF VISCOSITY OF A LIQUID
Filed Sept. 25, 1962   4 Sheets-Sheet 3
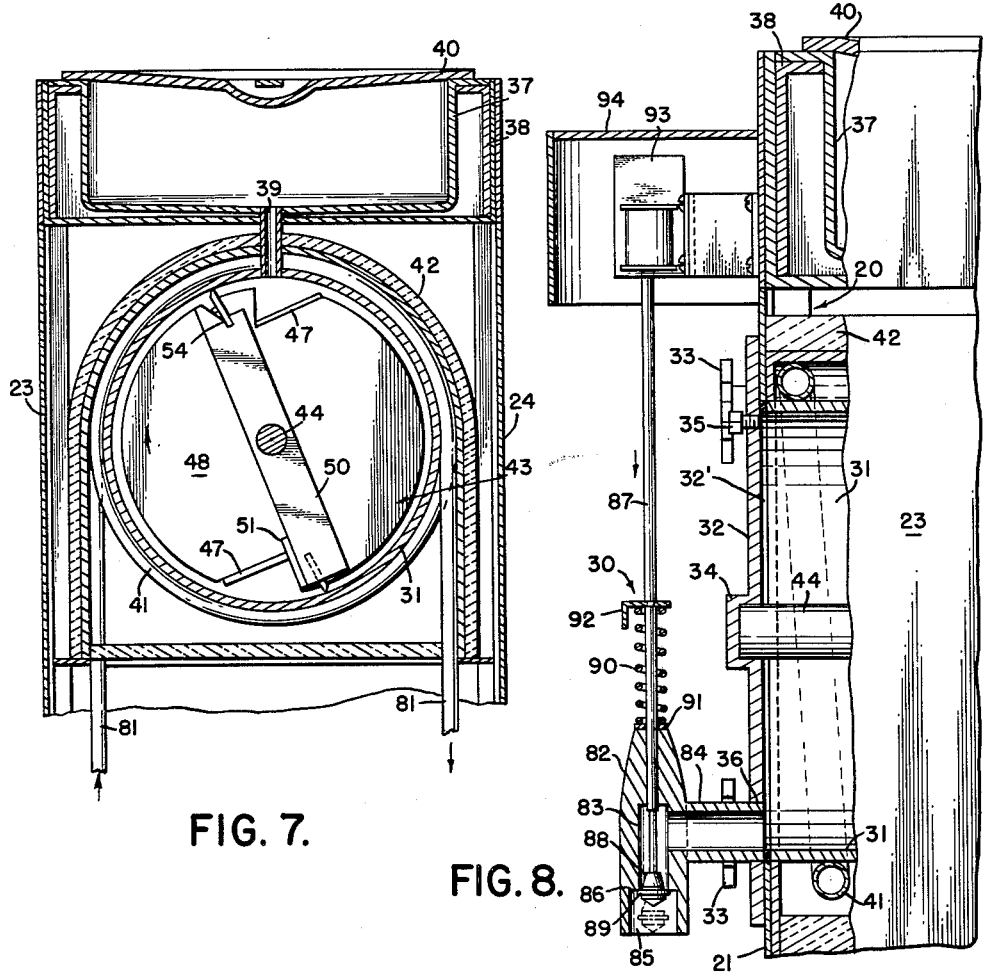
FIG. 7.
FIG. 8.
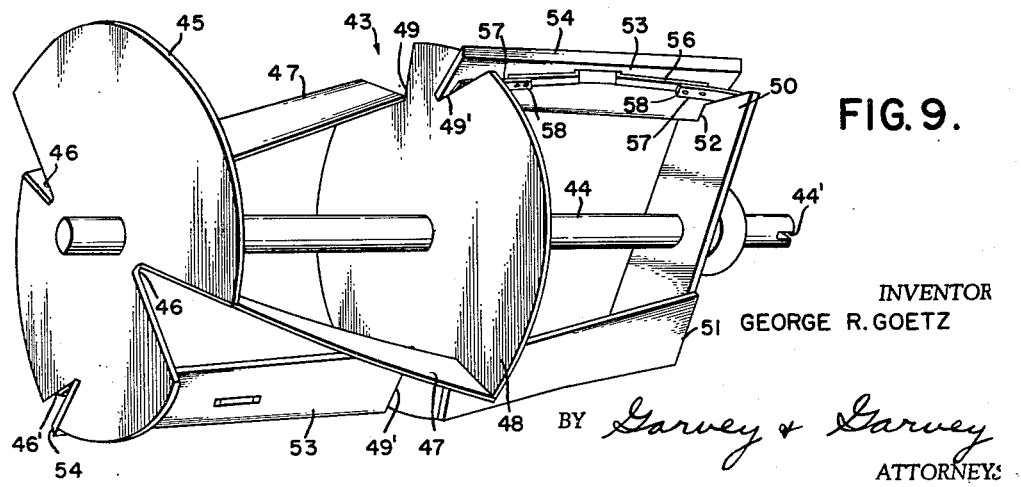
FIG. 9.
INVENTOR
GEORGE R. GOETZ
BY Garvey & Garvey
ATTORNEYS

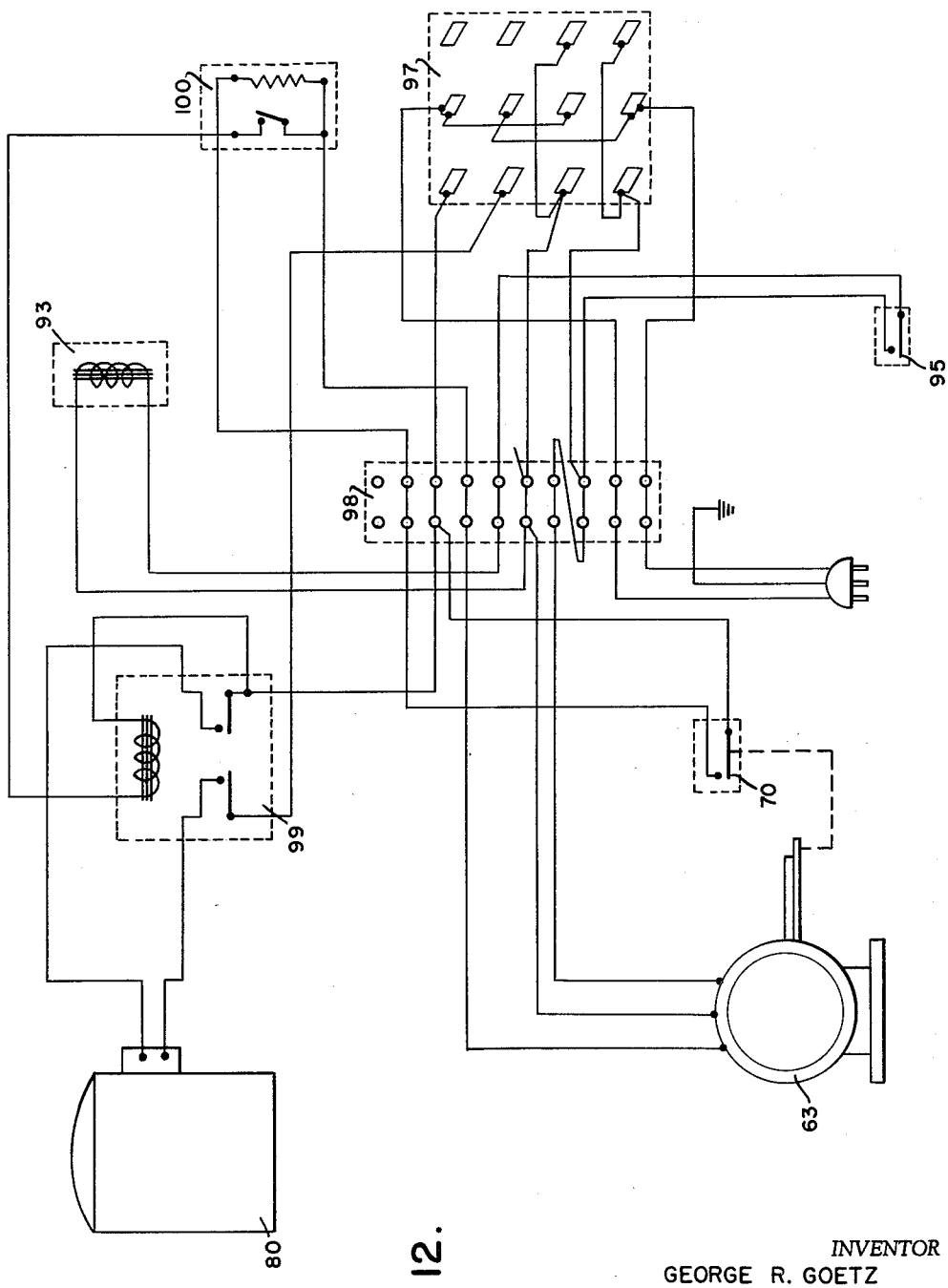

United States Patent Office 3,180,104
Patented Apr. 27, 1965

3,180,104
APPARATUS FOR SENSING THE CHANGE OF
VISCOSITY OF A LIQUID
George R. Goetz, Davenport, Iowa, assignor to H. C.
Duke & Son, Inc., East Moline, Ill.
Filed Sept. 25, 1962, Ser. No. 226,074
7 Claims. (Cl. 62—136)

This invention relates to an apparatus for sensing change in the viscosity of a liquid. It further contemplates apparatus for freezing and dispensing an edible product.

It is an object of this invention to provide an apparatus for sensing the change in viscosity of a liquid by mixing the liquid with agitating means operated by a freely mounted motor, the change in viscosity causing a change in resistance of the agitating means to movement through the liquid, resulting in a corresponding change in torque on the motor, with consequent rotation of the motor stator a predetermined amount, to indicate when the liquid has reached a predetermined viscosity.

Another object is to provide apparatus for freezing a liquid, the apparatus including means for constantly maintaining the liquid at a predetermined temperature and consistency, prior to dispensing the same.

Other objects are to provide apparatus of the character described in which the operation of the freezing apparatus is automatically controlled by variations in the consistency of the frozen liquid; to provide apparatus including agitating means for preventing adherence of frozen crystals on the freezer walls and the formation of large ice crystals, to produce a semi-frozen liquid of crystalline formation, known in the trade as "slush"; and to provide freezing apparatus including an electrically operated dispensing valve of novel construction.

Other objects of the invention will be manifest from the following description of the present preferred form of the invention, taken in connection with the accompanying drawings, wherein:

FIG. 4 is an enlarged rear elevational view of the same, the rear panel being removed to disclose details of construction;

FIG. 5 is an enlarged sectional view taken along the lines 5—5 of FIG. 4, looking in the direction of the arrows;

FIG. 6 is a sectional view taken along the lines 6—6 of FIG. 5, looking in the direction of the arrows, and showing to advantage the refrigeration control assembly forming a part of the present invention;

FIG. 7 is a sectional view taken along the lines 7—7 of FIG. 3, looking in the direction of the arrows, showing to advantage the freezing chamber and reservoir in communication therewith;

FIG. 8 is an enlarged side elevational view of the upper front portion of the freezing machine and showing to advantage the dispensing assembly forming a part thereof;

FIG. 9 is a perspective view of the reel assembly for the freezing chamber, forming a part of the present invention;

FIG. 10 is a plan view of a scraper blade adapted for engagement with the reel assembly;

FIG. 11 is a sectional view taken along the lines 11—11 of FIG. 10, looking in the direction of the arrows; and FIG. 12 is a schematic diagram of the electrical circuit for operating the freezing machine of the present invention.

Figure 3:
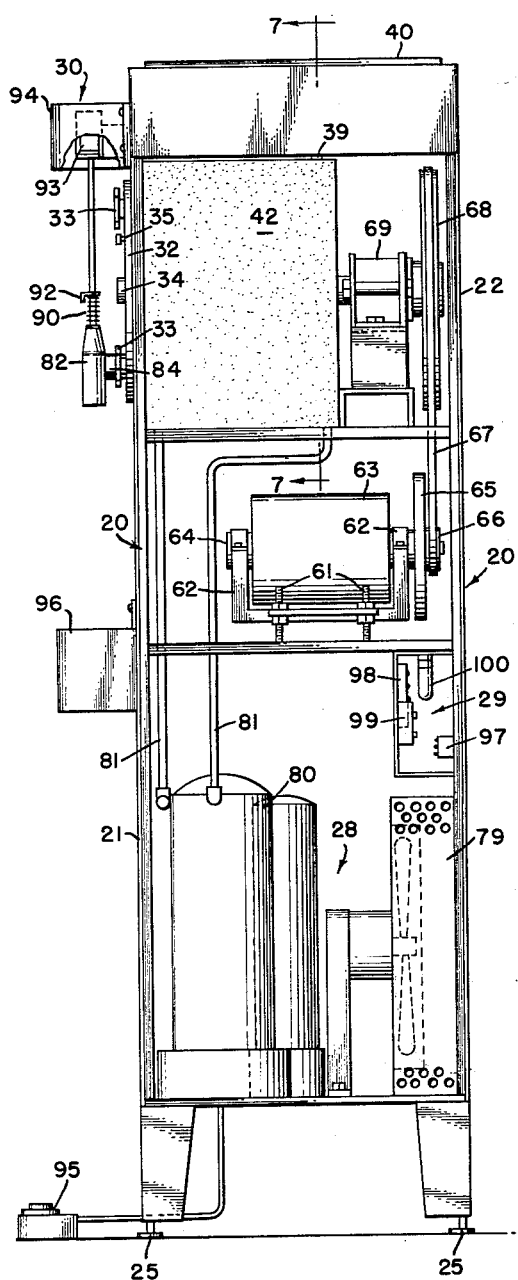
FIG. 3 is an enlarged side elevational view of the same, a side panel being removed to disclose details of construction.
Figure 1:
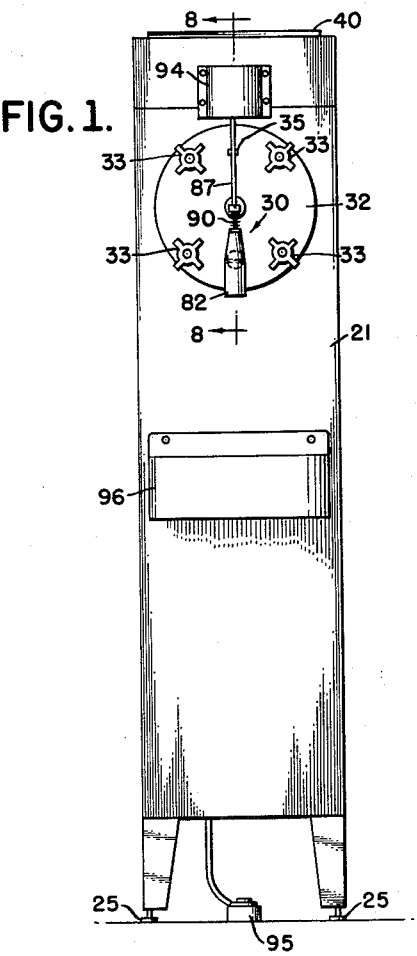
FIG. 1 is a front elevational view of the freezing machine of the present invention.
Figure 2:
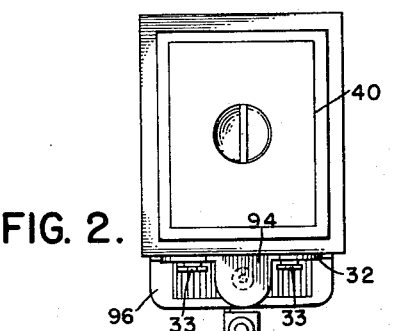
FIG. 2 is a top plan view of the same.

Referring now in greater detail to the drawings, there is illustrated a frame 20, including inter-connected vertical and horizontal members to which are attached a front panel 21, a rear panel 22 and side panels 23 and 24. Feet are indicated at 25. In accordance with the present invention, there are provided, in vertically spaced relationship within frame 20, a freezing assembly 26, a refrigeration control unit 27, and refrigerating mechanism 28. An electrical control panel 29 is positioned within frame 20 between refrigeration control unit 27 and refrigerating mechanism 28. A dispensing assembly 30 is located exteriorly of the frame on the front panel.

As shown to advantage in FIGS. 7 and 8, freezing assembly 26 includes a cylindrical freezing chamber 31 having a front door 32 secured to the chamber by hand knobs 33. A door seal is indicated at 32'. The central portion of door 32 is formed to provide a shaft bearing 34. An air release screw 35 permits freezing chamber 31 to be exhausted of air while being filled with liquid. The lower portion of front door 32 is provided with an opening 36 for communication with dispensing assembly 30. The liquid to be frozen is gravity fed to freezing chamber 31 from a reservoir pan 37 suitably mounted in a supporting frame 38, the bottom of which pan is provided with a connecting line 39 for feeding the liquid into freezing chamber 31. A pan lid is designated 40. A cooling coil 41 is wrapped around the outer wall of cylindrical freezing chamber 31 throughout its length, which coil is in communication with refrigerating mechanism 28. Insulation for the chamber is indicated at 42.

Freezing assembly 26 additionally includes a reel unit 43 which agitates the semi-frozen liquid and thrusts it towards the front of the cylindrical freezing chamber 31. Reel unit 43 additionally serves as a sensing element for the refrigeration control unit in a manner to be more fully hereinafter described. Unit 43 includes a central shaft 44 coextensive with chamber 31, one terminal of which is adapted to be journaled in bearing 34 of front door 32, as shown in FIG. 8. Reel unit 43 additionally includes a front disk 45 which is shaped in such a manner that it functions after the fashion of a propellor to assist moving the semi-frozen liquid forward for dispensing. The periphery of disk 45 is provided with opposed V-shaped recesses 46 from which V-shaped recesses, blades or curls 47 extend rearwardly into engagement with a center disk 48 at the locus of similarly opposed V-shaped peripheral recesses 49. Front disk 45 and center disk 48 are centrally mounted on shaft 44. A back plate 50 is also centrally mounted on shaft 44 in spaced relation to center disk 48 and is connected to the latter by means of a blade or curl 51.

In accordance with the present invention, front disk 45 is provided with a third peripheral V-shaped recess 46', center disk 48 is provided with a pair of opposed peripheral V-shaped recesses 49' and back plate 50 is provided with an angular V-shaped recess 52. These recesses are adapted for the reception of two removable spring-loaded scraper blades 53, preferably of plastic construction, one being located between front disk 45 and central disk 48 and the other between central disk 48 and plate 50. As shown in the drawings, the scraper blades are located on opposite sides of the reel unit. Scraper blades 53 include beveled edges 54 extending well beyond the peripheral limitations of disks 45 and 48 for contact with the wall of the cylindrical freezing chamber 31. As shown in FIG. 11, the central area of each scraper blade 53 is recessed at 55 and provided with spaced slots through which the central portion of a tension spring 56 passes.

The terminals of spring 56 are preferably connected to extensions 57, at 58, which extensions are coextensive with the scraper blades and have their terminals flexed downwardly at 59. This structure enables the scraper blades to be in constant contact against the inner periphery of the freezing chamber under spring tension and remove the frost or frozen liquid therefrom as it forms. The scraper blades also provide a resistance when passing through the liquid and this resistance, in conjunction with that provided by the three fixed blades or curls, controls the refrigeration mechanism. One end of shaft 44 is splined at 44' to facilitate connection with the means for rotating the reel unit within the freezing chamber.

Refrigeration control unit 27 includes a supporting frame 60 secured at 61 to frame 20. Both ends of the support are provided with cradle means 62. A conventional motor 63 of the order of one-sixth horsepower, is mounted on support frame 60, the terminals of the motor shaft of which are provided with ball bearing assemblies 64 adapted to be received in cradles 62. A fly wheel 65 is affixed to one end of the motor shaft to effect an even resistive load on the motor. A drive pulley 66 is mounted on the motor shaft extremity over which pulley is trained a belt 67, which engages a larger driven pulley 68 connected by suitable means 69, to the splined end 44' of reel unit 43.

Unit 27 additionally includes a trip arm 70, one end of which is welded or secured in any other similar manner, at a predetermined point on the stator or housing of motor 63. The opposite terminal of trip arm 70 is provided with a spring-pressed, adjustable contact screw 71 which extends through the trip arm for engagement with a switch member 72 of a micro switch 73, the switch member being in normally closed position. A stop member 74, in the path of movement of trip arm 70, positively limits the downward movement of the latter. Adjacent trip arm 70 is a compensating assembly embodying vertical support 75 which extends above trip arm 70, the lower end of which support is secured to support frame 60. Arms 76 extend outwardly from member 75 at points above and below trip arm 70, to which arms are connected spiral torsion balancing springs 77. The free ends of springs 77 are affixed to trip arm 70 at 78, to insure return of the trip arm to a neutral position when no forces are being exerted thereon by tension of the springs.

By mounting the motor 63 in cradle 62 on roller bearings, the stator or housing of the motor is thereby permitted to move freely in a direction opposite to that of the rotor of the motor. As the load on the motor is increased, the stator works against the balancing action of springs 77 through the trip arm to which the springs are attached. This motion causes contact screw 71 to move switch member 72 of micro switch 73. The rate of the two torsion balancing springs is such that the motion of movement of the trip arm is sufficient to achieve a sensitivity which will measure a change in torque equal to a 10-watt change in output of the motor load. Since the micro switch is in a normally closed position, the downward action of the trip arm causes the micro switch to open, which, in turn, through electrical circuitry, sets off the refrigerating mechanism. The adjustment of this motion is made by means of manipulation of contact screw 71 at the end of trip arm 70. The opening of the micro switch and the resultant shut off of the refrigerating mechanism is adjusted to take place when the temperature and/or consistency of the product within cylindrical freezing chamber 31 has reached a desired point.

Refrigerating mechanism 28 comprises a conventional cooling means comprising a condenser 79 and a compressor 80 in operative connection, which are in communication through conduits 81 with coils 41.

Dispensing assembly 30 includes a valve comprising a nozzle 82 having an orifice 83 which is in communication with opening 36 of freezing assembly 26 by means of an integral tubular connector 84. The diameter of orifice 83 is enlarged near its lower extremity as indicated at 85, to provide an abutment shoulder 86. A stem 87 extends longitudinally through nozzle 82 a substantial distance to the lower terminal of which is affixed a valve plug 88, having a seal 89. As shown in FIG. 8, seal 89 is normally contiguous with shoulder 86 which functions as a valve seat to prevent dripping. Superjacent nozzle 82, a convolute spring 90 is placed around stem 87, the lower terminal of which spring engages a seal 91 which is contiguous with the upper extremity of nozzle 82. The upper end of spring 90 contacts a clip 92 which is in fixed position on a reduced portion of stem 87. Stem 87 extends upwardly to a conventional solenoid 93 located within housing 94. Actuation of solenoid 93 is effected by means of a foot switch 95, electrically connected thereto, which is placed on the floor at the front of the machine. Upon actuation of solenoid 93, stem 87 is thrust downwardly against the tension of spring 90 which thrusts valve plug 88 to the position shown in dotted lines in FIG. 8, thereby permitting the frozen product to flow from nozzle 82. Plug 88 returns to its normally closed position when the foot is removed from switch 95 by virtue of detention of spring 90. A drip pan 96 is removably attached to the front panel 21.

Electrical control panel 29 includes a four-pole, double-throw switch 97 which is in circuit with a terminal block 98. A magnetic starter is indicated at 99, which is electrically connected with the refrigeration mechanism. 100 designates a delay relay tube, also in circuit with the refrigeration mechanism and the refrigeration control unit, to prevent constant off and on operation of the refrigeration mechanism in a well known manner. In FIG. 12 there is shown the circuitry for electrically operating the various electrical parts of the present invention, which parts are numbered. Operation is effected by conventional electrical circuitry, with the exception, of course, of the provision of a trip arm 70 operative in the manner described for operating the refrigeration mechanism.

In use of the present invention, there is preferably placed within the reservoir pan 37, a neutral base comprising sugar, water, stabilizer, citric acid, vegetable gums, etc. Flavor is added to the drink in concentrated form by placing approximately one-quarter ounce thereof in a cup which is mixed with the frozen neutral base dispensed by the machine. If desired, a flavor base may be used in a machine in lieu of a neutral base. After the base has been added to the pan reservoir, it gravitates through connecting line 39 into cylindrical freezing chamber 31. Switch 97 is actuated to operate motor 63, condenser 79 and compressor 80, to initiate the cooling cycle. As the cooling takes place, reel unit 43 continuously rotates and scraper blades 53 wipe frost and frozen product from the chamber wall and additionally serve to sense the change in resistance to movement through the liquid, as the product begins to freeze. When the product reaches a predetermined temperature, as gauged by the consistency thereof, trip arm 70 will rotate until contact screw 71 actuates switch member 72 to shut off the refrigeration mechanism. It has been found that optimum results are obtained when the trip arm assembly is set to maintain the temperature of the product at 27° F.

As the temperature within the chamber rises and the liquid begins to melt, the melting action is sensed by reel unit 43 which meets decreased resistance during rotation, resulting in counter-rotation of trip arm 70 and disengagement of contact screw 71 and switch member 72. After a period determined by delay relay tube 100, the refrigeration mechanism is again actuated to resume the freezing process. In this manner, the temperature of the product is actually controlled by the texture or consistency of the product and not by use of a thermostat or other electrical device, thereby affording a simple, but satisfactory method of controlling temperature and/or viscosity. By the constant movement of the reel unit through the freezing chamber, and the constant engagement of the various blades thereof with the liquid, a very fine ice crystal and a product of snow-like texture is obtained.

As applied to a frozen product, the torsion sensing system of the present invention has the capability of sensing a change in temperature down to one-tenth of a degree. At the same time, this system can sense a change in output wattage of a motor to a small percentage of its rating.

While the method and apparatus have been shown and described in connection with the freezing and dispensing of a semi-frozen drink, it is realized that this same system can be used as a means of controlling the addition of powders, thickening agents, dry products, etc., to a fluid; or conversely, as a means of sensing the thickness or viscosity of a heavy mixture, to which a thinning agent or a liquid is added, until a desired point is reached. Various other changes may be made within the scope of the claims hereto appended.

What is claimed is:

1. Apparatus for sensing the change in viscosity of liquid in a container with an agitator rotatably mounted therein; a motor, supported in proximity to the container, in operative engagement with said agitator, a part of the motor being movable, when the load on the motor reaches a predetermined point, through increased viscosity of the liquid being agitated in the container, a trip arm, one end of which is engaged to the movable part of the motor, stationary supporting means at predetermined distances above and below said trip arm, like balancing means extending from each of said supporting means to opposite faces of said trip arm, to effect return of the arm, to a neutral position, when the load on the movable part of the motor is relieved, and a switch in the path of movement of the trip arm, and operable, by the latter, when the movable part of the motor has traveled a predetermined distance.

2. Apparatus for sensing the change in viscosity of a liquid in a container having a liquid agitator, including a motor, the shaft of which is operatively connected to the liquid agitator, means for supporting said motor to permit rotational movement of the stator of the motor upon increase of the load on the latter due to increased viscosity of the liquid, a trip arm, one end of which is secured to, and rotatable with, the stator, stationary supporting means at predetermined distances above and below said trip arm, like balancing springs extending from each of said stationary supporting means to said trip arm, to insure return of the latter to a neutral position, when no forces are being exerted on the stator, and switch means in the path of movement of said trip arm, and actuated by the latter, upon rotation of the trip arm and stator a certain distance, to indicate the liquid has reached a predetermined viscosity.

3. The apparatus of claim 2, with the addition of adjustable contact means carried by said trip arm and engageable with said switch means, for varying the tripping of the switch means with respect to the viscosity of the liquid.

4. The apparatus of claim 2, with the addition of a flywheel affixed to the shaft of said motor, to effect an even resistive load on the motor.

5. The apparatus of claim 2, with the addition of a stationary stop member in the path of movement of said trip arm to positively limit the rotational movement of said trip arm and stator.

6. Apparatus for controlling the viscosity of a liquid in a container having freezing mechanism and a liquid agitator, including a motor, the shaft of which is operatively connected to the liquid agitator, anti-friction bearing assemblies affixed to the terminals of the motor shaft, a support frame having cradles adapted to receive said anti-friction bearing assemblies to permit rotational movement of the stator of the motor upon increase of the load on the latter, due to increased viscosity of the liquid, a trip arm, one end of which is secured to, and rotatable with, the stator, a stationary vertical support mounted on said support frame, arms extending outwardly from said vertical support above and below said trip arm, like balancing springs extending from each of said arms to said trip arm, to insure return of the latter to a neutral position when no forces are being exerted thereon by tension of the springs, and an electrical switch in the path of movement of said trip arm and actuated by the latter upon rotation of the trip arm and stator a certain distance, said switch being in circuit with the freezing mechanism of the liquid container and serving to inactivate the former when actuated by the trip arm, after the liquid has attained a predetermined relationship.

7. The apparatus of claim 6, with the addition of a spring-pressed contact screw threaded through said trip arm for engagement with said switch, said contact screw being threadedly adjustable to alter the point of tripping said switch.

References Cited by the Examiner
UNITED STATES PATENTS

| | | | |
|---|---|---|---|
| 2,645,911 | 7/53 | Martin | 62—343 |
| 2,825,776 | 3/58 | Curtis | 200—61.46 |
| 2,836,401 | 5/58 | Phelan | 259—109 |
| 2,961,853 | 11/60 | Cohrt | 62—518 |
| 3,004,398 | 10/61 | Mullins | 62—136 |
| 3,013,398 | 12/61 | Thomas | 62—156 |
| 3,075,480 | 1/63 | Berg | 62—136 |

ROBERT A. O'LEARY, *Primary Examiner.*
MEYER PERLIN, *Examiner.*